US009286583B2

(12) United States Patent
Hosurmath et al.

(10) Patent No.: US 9,286,583 B2
(45) Date of Patent: Mar. 15, 2016

(54) INTEGRATING MIND MAPPING TECHNOLOGY WITH CASE MODELING

(75) Inventors: Manjula G. Hosurmath, Bangalore (IN); Seema Meena, Rajasthan (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 948 days.

(21) Appl. No.: 13/310,838

(22) Filed: Dec. 5, 2011

(65) Prior Publication Data

US 2013/0144917 A1    Jun. 6, 2013

(51) Int. Cl.
*G06F 7/00* (2006.01)
*G06Q 10/06* (2012.01)

(52) U.S. Cl.
CPC ..................... *G06Q 10/06* (2013.01)

(58) Field of Classification Search
USPC .......................................................... 707/803
See application file for complete search history.

(56) References Cited

U.S. PATENT DOCUMENTS

| 6,757,739 | B1 * | 6/2004 | Tomm et al. ................. 709/236 |
| 7,702,679 | B2 | 4/2010 | Barber et al. |
| 8,364,623 | B1 * | 1/2013 | Bunker et al. .................. 706/47 |
| 2007/0038683 | A1 * | 2/2007 | Dixon et al. .................. 707/202 |
| 2008/0320486 | A1 | 12/2008 | Bose et al. |
| 2009/0043592 | A1 | 2/2009 | Heimann et al. |
| 2009/0119584 | A1 | 5/2009 | Herbst |

FOREIGN PATENT DOCUMENTS

WO    WO 2009/055465 A2    4/2009

OTHER PUBLICATIONS

Davies, Martin. "Concept mapping, mind mapping and argument mapping: what are the differences and do they matter?." Higher education 62.3 (2011): 279-301., Published online: Nov. 27, 2010.*
Richards, Gregor, et al. "An analysis of the dynamic behavior of JavaScript programs." ACM Sigplan Notices. vol. 45. No. 6. ACM, 2010.*
Shih, Patrick C., et al., "GroupMind: Supporting Idea Generation through a Collaborative Mind-mapping Tool", Proceedings of GROUP '09, May 10-13, 2009, Sanibel Island, FL, 10 pages.

* cited by examiner

*Primary Examiner* — Alex Gofman
*Assistant Examiner* — Muluemebet Gurmu
(74) *Attorney, Agent, or Firm* — Marcia L. Doubet (57) ABSTRACT

Mind mapping technology is integrated with a case management solution. Business process design discussions and brainstorming details from a mind mapping tool can be captured, and key nodes that are relevant for case management can be identified in a mind mapping diagram. The key nodes can then be augmented by associating metadata therewith, enabling data associated with the nodes to be transformed for use as case management objects in the case management solution. In preferred embodiments, this transformation comprises generating a markup language document to represent the objects that correspond to the key nodes, wherein this markup language document conforms to syntax requirements of a solution definition file that is consumable by the case management system.

18 Claims, 11 Drawing Sheets

```
<map version="0.9.0">
<!-- To view this file, download free mind mapping software FreeMind from http://freemind.sourceforge.net -->
<node CREATED="1306048345031" ID="ID_803927389" MODIFIED="1318237989906" TEXT="Banking Solution">
    <attribute NAME="Type" VALUE="Solution"/>
    <attribute NAME="Prefix" VALUE="BS"/>―242
    <attribute NAME="Desc" VALUE="Solution Desc"/>―243
┌   <node CREATED="1306048529781" HGAP="116" ID="ID_1591987019" MODIFIED="1318238230187"
│       POSITION="left" TEXT="Customer Name" VSHIFT="-51">
│       <attribute NAME="type" VALUE="property"/>―221
│       <attribute NAME="propertyClass" VALUE="String"/>―222
│       <attribute NAME="Desc" VALUE="name of the customer"/>―223
└   </node>
                                        /201    /202
┌   <node CREATED="1318237862812" HGAP="-414" ID="ID_505168071" MODIFIED="1318238236062"
│       POSITION="right" TEXT="Account Type" VSHIFT="-162">―203
│       <attribute NAME="type" VALUE="property"/>―211
│       <attribute NAME="propertyClass" VALUE="String"/>―212
│       <attribute NAME="Desc" VALUE="Type of account"/>―213
└   </node>
┌   <node CREATED="1306048448453" HGAP="147" ID="ID_339422635" MODIFIED="1318237874046"
│       POSITION="right" TEXT="Administrator" VSHIFT="45">
│       <attribute NAME="type" VALUE="role"/>―261
│       <attribute NAME="description" VALUE="Do all admin work"/>―262
└   </node>
```

```
    ┌ <node CREATED="1318237729468" HGAP="150" ID="ID_1643784062" MODIFIED="1318237936953"
    │   POSITION="right" TEXT="Cashier" VSHIFT="24">
270 │     <attribute NAME="Type" VALUE="role"/>─271
    │     <attribute NAME="description" VALUE="Cashier will collect money"/>─272
    └ </node>

┌ <node CREATED="1318237802000" HGAP="-453" ID="ID_107780796" MODIFIED="1318238211937"
    │   POSITION="left" TEXT="Manager" VSHIFT="46">
280 │     <attribute NAME="type" VALUE="role"/>─281
    │     <attribute NAME="description" VALUE="Bank Manager"/>─282
    └ </node>

┌ <node CREATED="1318238011578" HGAP="-72" ID="ID_491580317" MODIFIED="1318238218375"
    │   POSITION="left" TEXT="Personal Banking" VSHIFT="45">
    │     <attribute NAME="Type" VALUE="CaseType"/>─251
    │     <attribute NAME="Desc" VALUE="Personal banking related tasks"/>─252
250 │     ┌ <node CREATED="1318238145296" HGAP="62" ID="ID_152413822" MODIFIED="1318238205828"
    │     │   TEXT="Account Opening" VSHIFT="31">
    │  230│     <attribute NAME="Type" VALUE="Task"/>─231
    │     │     <attribute NAME="Desc" VALUE="Account opening workflow"/>─232
    │     └ </node>
    └ </node>
240─  </node>
      </map>
```

FIG. 3

```xml
300
<?xml version="1.0" encoding="UTF-8" standalone="yes"?>
<solution>
  <name>Banking Solution</name>
  <description>Solution Desc</description>                                      —343
  <prefix>BS</prefix>        —342
  <schemaVersion>1.0</schemaVersion>
  <productName>Case Designer </productName>
  <productVersion>1.0</productVersion>
  <properties>
    <propertyStringDefinition>
      <element:id>{FC6E60A1-9BEC-40D6-8198-0FEEBD5A15D9}</element:id>
      <element:localName>BS_CustomerName</element:localName>
      <element:displayName>Customer Name</element:displayName>
      <element:description>name of the customer</element:description>           —323
      <element:propertyType>string</element:propertyType>         —322
      <element:defaultValue/>
    </propertyStringDefinition>
    <propertyStringDefinition>
      <element:id>{908F3A7A-0FDE-47D6-902A-516A6AF4CBF5}</element:id>
      <element:localName>BS_AccountType</element:localName>
      <element:displayName>Account Type</element:displayName>
      <element:description>Type of account</element:description>                —313
      <element:propertyType>string</element:propertyType>         —312
      <element:defaultValue/>
    </propertyStringDefinition>
  </properties>
```

```
<RoleDefinitions>
    <RoleDefinition>
        <element:localName>BS_administrator</element:localName>
        <element:name>Administrator</element:name>
        <element:description>Do all admin work</element:description>—362
        <element:type>1</element:type>
    </RoleDefinition>                                                    360
    <RoleDefinition>
        <element:localName>BS_Cashier</element:localName>
        <element:name>Cashier</element:name>
        <element:description>Cashier will collect money</element:description>—372
        <element:type>1</element:type>
    </RoleDefinition>                                                    370
    <RoleDefinition>
        <element:localName>BS_Manager</element:localName>
        <element:name>Manager</element:name>
        <element:description>Bank Manager</element:description>—382
        <element:type>1</element:type>
    </RoleDefinition>                                                    380
</RoleDefinitions>                                                       392
</solution>                                                              340
```

```
{"solution":{
    "name":"Banking Solution",
    "description":"Solution Desc",
    "prefix":"BS",
    "properties":
    {
        "property": [{"localName":"BS_AccountType",
                      "displayName":"Account Type",
                      "id":"-1",
                      "description":"Type of account",
                      "propertyType":"string"},
                     {"localName":"BS_CustomerName",
                      "displayName":"Customer Name",
                      "id":"-1",
                      "description":"name of the customer",
                      "propertyType":"string"}]},
        "caseTypes": {
            "caseType": {"name":"BS_PersonalBanking",
                         "displayName":"Personal Banking",
                         "id":"-1",
                         "description":"Personal banking related tasks",
                         "tasks": {"task": {
```

```
    "name":"BS_AccountOpening",
    "displayName":"Account Opening",
    "id":"-1",
    "description":"Account opening workflow",
    "launchMode":"automatic",
    "required":"false",
    "workflowName":"BS_AccountOpening"}
  },
  "roles": {
    "role": [ {
      "name":"Administrator",
      "localName":"BS_Administrator",
      "description":"Do all admin work"
    },
    {
      "name":"Cashier",
      "localName":"BS_Cashier",
      "description":"Cashier will collect money"
    },
    {
      "name":"Manager",
      "localName":"BS_Manager",
      "description":"Bank Manager"
    } ]
  }
}
```

INTEGRATING MIND MAPPING TECHNOLOGY WITH CASE MODELING

BACKGROUND

The present invention relates to computing systems, and deals more particularly with integrating mind mapping technology with a case management system to generate a case model.

Case management systems are known in the art, and provide automated techniques to assist an enterprise in managing complex workloads. A case-driven paradigm may be used, for example, to provide a business service for a customer of an enterprise. A case file may be created to deliver the business service as a collaborative effort and to track its progress, including one or more processes that may be carried out by various team members as they collaborate to deliver the service. More generally, a case management system allows for modeling real-world business activities. Upon completion of the process or processes for a particular case, the case is generally marked as resolved and then closed. One commercially-available case management system is the IBM Case Manager product from International Business Machines Corporation.

So-called "mind mapping" systems are also known in the art, whereby automated techniques are provided to capture and organize various thoughts of a group of people as they collaborate in a brainstorming session. Generally, a mind mapping system places a central topic of the brainstorming session into a central region of a graphical user interface, and related topics or concepts that arise during the brainstorming session are then arranged in a radial pattern extending from the depiction of this central topic. The elements in a given mind map are typically arranged intuitively in the radial pattern, according to importance of the concepts represented. Elements of a mind map may also be classified into different categories or groups. One example of a commercially-available mind mapping system is known as "FreeMind".

BRIEF SUMMARY

The present invention is directed to integrating mind mapping with case management. In one aspect, this comprises: obtaining a mind mapping diagram created in a mind mapping tool, the diagram comprising a plurality of nodes, the nodes augmented with metadata describing attributes of corresponding target objects for use in a case management tool; and programmatically converting a representation of the mind mapping diagram from a first format used by the mind mapping tool to a second format used by the case management tool. In another aspect, an embodiment of the present invention comprises: creating a mind mapping diagram in a mind mapping tool, the diagram comprising a plurality of nodes; augmenting the nodes with metadata describing attributes of corresponding target objects; and converting a representation of the mind mapping diagram from a first format used by the mind mapping tool to a second format used by the case management tool.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

The present invention is directed to integrating mind mapping technology with case management to generate a case model for a case management solution. When using known case management systems, a business analyst who is responsible for designing a case management solution must go through a tedious process of manually creating the artifacts that are needed for building each case model. Typically, the business analyst defines workflow, roles, properties, dependencies and so forth, with pen and paper, to create use cases that will model real-world business activities. Case management systems are often used for making critical design decisions, and improvements are desired to help the business analyst capture and represent key ideas which are the basis for these design decisions.

Using an embodiment of the present invention, business process design discussions and brainstorming details from a mind mapping tool can be captured, and key nodes that are relevant for case management can be identified in a mind mapping diagram. The key nodes can then be augmented by associating metadata therewith, enabling data associated with the nodes to be transformed for use as case management objects in the case management solution. In preferred embodiments, this transformation comprises generating a markup language document to represent the objects that correspond to the key nodes. More particularly, in several embodiments, the data underlying the augmented mind mapping diagram is preferably saved as an Extensible Markup Language, or "XML", document (as will be discussed in more detail below).

Mapping the output of a mind mapping tool—that is, a mind mapping diagram, sometimes referred to simply as a "mind map"—to a markup language document that conforms to syntax of a case management solution definition file, as disclosed herein, allows the augmented mind mapping output to be consumed by a case management system or case modeling tool. (The terms "case management system" and "case modeling tool" are used synonymously herein.) In a preferred approach (as discussed in more detail below), the case management solution definition file is generated from the mind mapping diagram by programmatically converting an XML document that represents the mind mapping diagram drawn by collaborators during a brainstorming session into a solution definition file syntax used by the case modeling tool. In several embodiments, this solution definition file is also encoded in XML; in one alternative embodiment, the JSON notation is used instead.

The mind mapping solution artifacts resulting from a conversion as disclosed herein are then automatically shown in the case modeling tool, in preferred embodiments, by the case management system understanding the business objects defined by the syntax in the case management solution definition file.

Mind mapping systems are useful for capturing and organizing information during brainstorming sessions, as noted earlier. An embodiment of the present invention enables bringing this free-form information into the design environment of a case management system. A business analyst using the case management system can thereby benefit from "design time brainstorming", whereby a mind mapping system can be leveraged for the capturing and organizing of solution definition artifacts that will model a particular case management solution. A multi-user, collaborative approach to case modeling, including requirements gathering and design, can thereby be provided for business analysts who model business problems with case management systems.

Figure 1:
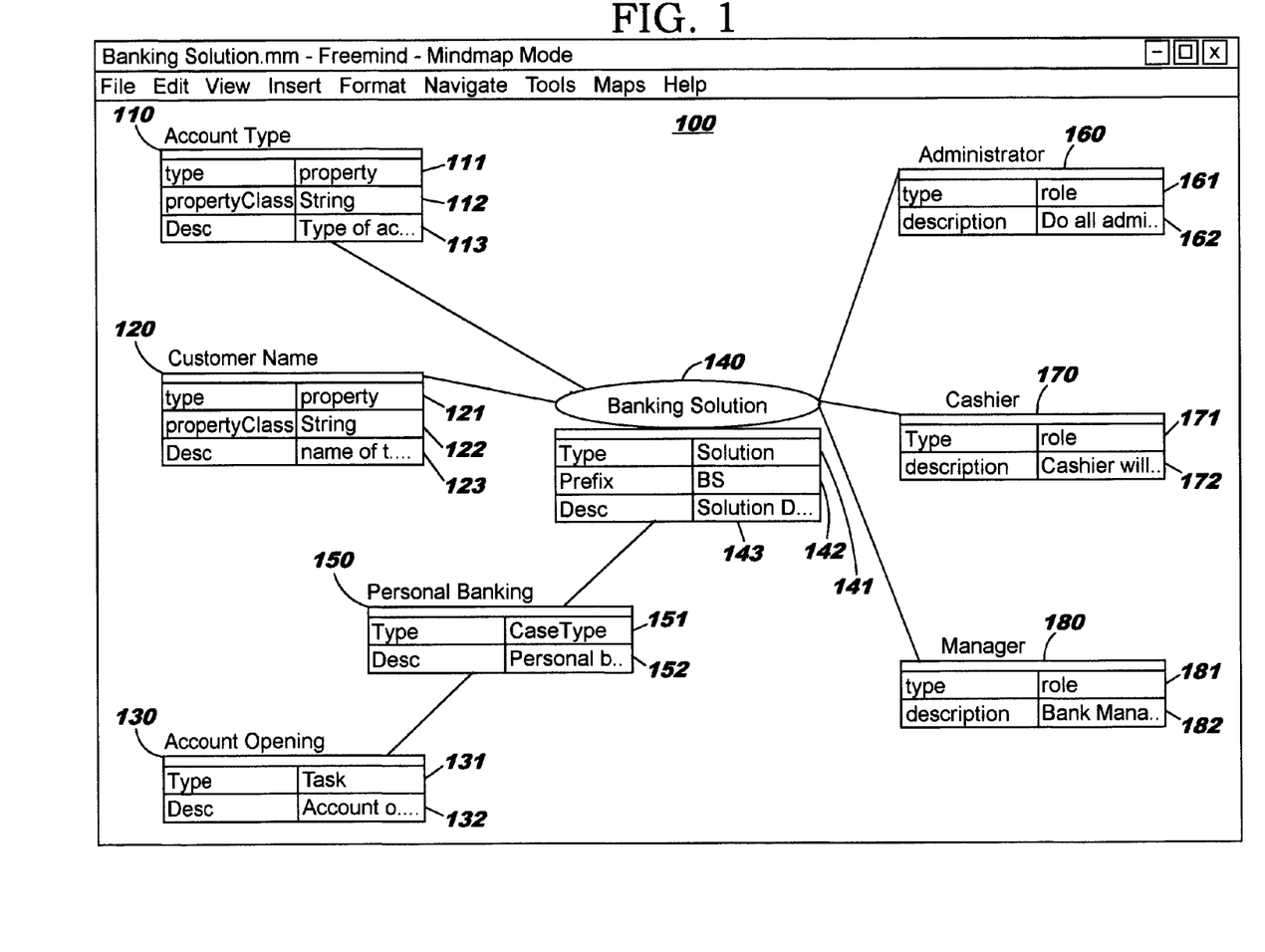
FIG. 1 illustrates a graphical user interface of a mind mapping system in which solution entities are extended with metadata to define them as solution objects, according to an embodiment of the present invention.

FIG. 1 illustrates a graphical user interface of a mind mapping system in which solution entities are extended with metadata to define them as solution objects, according to an embodiment of the present invention. The example mind map 100 shown in FIG. 1 is representative of a banking solution, and thus is designated "Banking Solution" in the central graphical element 140. The example banking solution is defined as being of a case type "Personal Banking", as shown at graphical element 150. This personal banking case type includes a task for "Account Opening", as shown at 130. The banking solution of the example further includes two properties, which are "Account Type" as shown at 110 and "Customer Name" as shown at 120. Three different roles are defined for the banking solution of the example, namely "Administrator" 160, "Cashier" 170, and "Manager" 180.

According to an embodiment of the present invention, a user has augmented the mind map 100 with metadata that further describes each of the graphical elements and enables them to be converted to case management solution objects. At a highest level of the hierarchy of related elements, the Banking Solution element 140 is thus defined as being of type "Solution". See reference number 141. A "Prefix" attribute is defined, and in the example, has a value of "BS". See reference number 142. Typically, the Prefix value is prepended to names of files used for storing information externally and to names of objects, thereby identifying the files and objects as belonging to a particular solution. A "Desc" (i.e., description) attribute is also defined for this highest level of the hierarchy. See reference number 143.

The Banking Solution element 140 is defined, in this example, as having a Personal Banking child element 150 that has "Type" and "Desc" attributes, and the values of these attributes are set to "CaseType" and "Personal banking related tasks", respectively. See reference numbers 151, 152.

(While some of the information in FIG. 1 has been truncated for display, such as the "Personal b . . . " value shown for the "Desc" attribute of element 150, reference may be made to the XML document 200 of FIG. 2, where the sample data values corresponding to FIG. 1 are shown in full.)

An Account Opening element 130 is defined as having "Type" and "Desc" properties, and the values are set to "Task" and "Account opening workflow", respectively. See reference numbers 131, 132. Accordingly, mind map 100 indicates that a task 130 is to be defined for opening an account in the personal banking case type 150.

Each of the elements 110, 120 is defined as having a "type", a "propertyClass", and a "Desc" attribute, in the example. In each case, the value of "type" is "property". See reference numbers 111, 121. For the example, both elements 110, 120 are of property class "String". See reference numbers 112, 122. The "Desc" attribute of the Account Type element 110 is defined to hold a description of the type of account, and the "Desc" attribute of the Customer Name element 120 is defined to hold a name of the customer. See reference numbers 113, 123.

The Administrator, Cashier, and Manager elements 160, 170, 180 are each defined as having two attributes, namely a "type" and a "description". See, for example, reference numbers 161, 162. In each case, the value of the "type" attribute is "role". The value of the "description" attribute for these roles is "Do all admin work" 162, "Cashier will collect money" 172, and "Bank Manager" 182, respectively.

In a preferred approach, attribute categories are predefined for selection by a user of the mind mapping system, where these predefined attribute categories provide attribute types and values that are relevant to, and understood by, the target case management system. Thus, a user who creates the graphical element that represents an Administrator role at 160 may activate a pop-up menu or pull-down menu by a right-click action (for example), where this menu displays attribute choices that include "type" 161 and "description" 162, and allowable values for the "type" attribute 161 preferably include "role". Similarly, selectable attribute choices preferably include "propertyClass" 112 and "Desc", and allowable values for the "type" attribute preferably further include "property", as shown at 111. Selectable values for the "propertyClass" attribute may include "String", as shown as 112, "Integer", "Boolean", and so forth.

Figure 2:
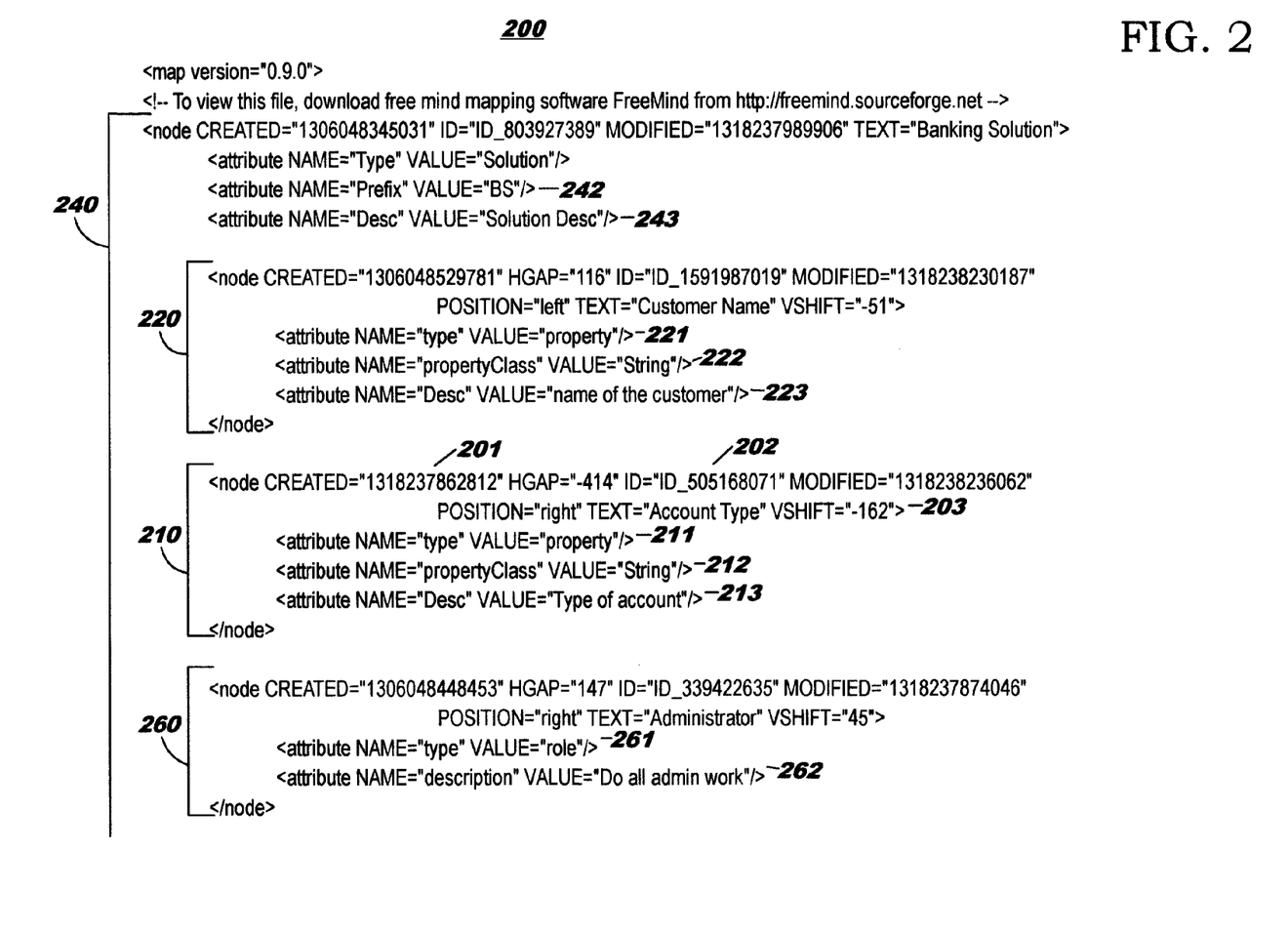
FIG. 2 provides a sample markup language document that may be generated as output of a mind mapping system.

FIG. 2 provides a sample markup language document 200 that may be generated as output of a mind mapping system, and in this example, corresponds to the mind map 100 of FIG. 1. This sample document 200 has been created as output of the commercially-available mind mapping system known as "FreeMind". As can be seen by inspection, the document 200 is an XML document that comprises a <node> element 240 at a highest hierarchical level, and this <node> element 240 corresponds to node 140 of FIG. 1. Attributes of the central topic in the mind map 100 are represented in document 200 as attributes of this highest-level <node> element 240. See, for example, <attribute> element 242, which corresponds to attribute 142, and <attribute> element 243, which corresponds to attribute 143.

Each of nodes 110, 120, 160, 170, and 180 from mind map 100 has a corresponding <node> element 210, 220, 260, 270, 280 in document 200, where these <node> elements are child nodes of <node> element 240. In addition, <node> element 250 is also a child node of element 240, and corresponds to node 150 of FIG. 1. This <node> element 250 further has a child <node> element 230, which corresponds to node 130 of FIG. 1.

Each <node> element of document 200 also contains various attributes used internally by the mind mapping tool, such as a string that represents the date and time of creation of the corresponding node on the user interface of the mind mapping tool (see reference number 201), an identifier for the node within the mind mapping tool (see reference number 202), positional placement information for the node on the user interface (see reference number 203), and so forth.

As can also be seen by inspection, each of the attributes depicted in the metadata that augments the nodes of FIG. 1 is represented in document 200 by a corresponding <attribute> node, and each <attribute> node comprises a "NAME" attribute and a "VALUE" attribute. For example, the "type=role" metadata shown at 161 is represented in the <attribute> element at 261 with attributes "NAME" set to "type" and "VALUE" set to "role".

Figure 3:
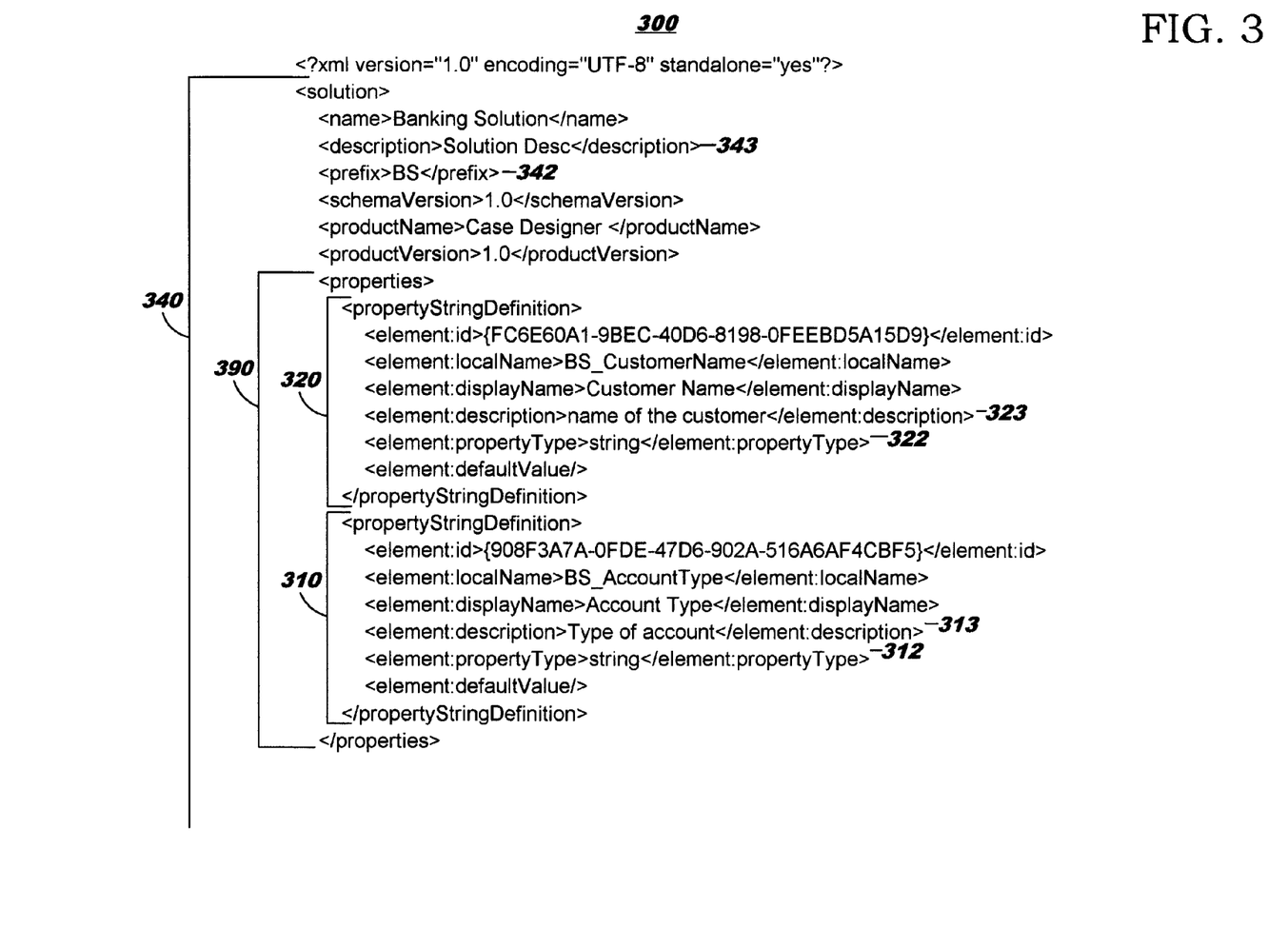
FIG. 3 provides a sample markup language document that may be generated as input to a case management system, and which corresponds to the mind mapping system output document shown in FIG. 2.

FIG. 3 provides a sample markup language document 300 that may be generated, according to an embodiment of the present invention, as input to a case management system. Notably, document 300 adheres to the syntax of a solution definition file used as input by the case management system. This sample document 300 has been created, according to an embodiment of the present invention, from the corresponding sample mind mapping system output document 200 shown in FIG. 2. A <solution> element 340 at a highest hierarchical level of sample document 300 is created from <node> element 240 of FIG. 2 (and therefore corresponds to node 140 of FIG. 1). Attributes of the central topic in the mind map 100 are represented in document 300 as attributes of this highest-level <solution> element 340. See, for example, <description> element 343, which corresponds to attribute 143 and is created from <attribute> element 243 of FIG. 2, and <prefix> element 342, which corresponds to attribute 142 and is created from <attribute> element 242.

The solution definition file used by a case modeling tool, in one approach, is defined as having one or more properties, one or more case types, and one or more roles. Accordingly, a <properties> element 390, a <caseTypes> element 391, and a <RoleDefinitions> element 392 are generated as child nodes of <solution> element 340. Each of these elements 390-392 will now be discussed in more detail.

The <properties> element 390 contains a child <propertyStringDefinition> element for each property node (i.e., each node of type "property") of type String that was defined in the mind map. Accordingly, <propertyStringDefinition> element 320 represents node 120 and <propertyStringDefinition> element 310 represents node 110. In a preferred embodiment, <propertyStringDefinition> element 310 is generated responsive to detecting the presence of the value "property" in the "VALUE" attribute of <attribute> element 211 of document 200. The <attribute> elements 212, 213 of document 200—which correspond to properties 112, 113 from FIG. 1—are then transformed by an embodiment of the present invention into elements 312, 313 within the <propertyStringDefinition> element 310 of document 300. Similarly, <propertyStringDefinition> element 320 is generated responsive to detecting the presence of the value "property" in the "VALUE" attribute of <attribute> element 221 of document 200, and <attribute> elements 222, 223 are then transformed into elements 322, 323 within the <propertyStringDefinition> element 320 of document 300. (Although only property nodes of type String are shown in this example at 110 and 120, this is by way of illustration and not of limitation. If a property node of type Integer is used in a different scenario, for example, then the <properties> element 390 would contain a child <propertyIntegerDefinition> element. Similarly, child nodes having element names of the form <property . . . Definition> may be used with other property types, although not shown in this example, where the " . . . " is replaced by the type of the property.)

The <caseTypes> element 391 contains a child <caseType> element for each case type node (i.e., each node of type "CaseType") that was defined in the mind map. Accordingly, <caseType> element 350 represents node 150. In a preferred embodiment, <caseType> element 350 is generated responsive to detecting the presence of the value "CaseType" in the "VALUE" attribute of <attribute> element 251 of document 200. The <attribute> element 252 of document 200—which corresponds to property 152 from FIG. 1—is then transformed by an embodiment of the present invention into element 352 within the <caseType> element 350 of document 300.

In a solution definition file syntax used by a preferred embodiment, each <caseType> element includes information for one or more tasks. See <tasks> element 355. In this example, a single task (i.e., a single node of type "Task") has been defined in the underlying mind map at 130. This task is represented in document 200 by <node> element 230. A preferred embodiment therefore generates <task> element 330 responsive to detecting the presence of the value "Task" in the "VALUE" attribute of <attribute> element 231 of document 200, and <attribute> element 232 is then transformed into element 332 within the <task> element 330 of document 300. In this example, <attribute> element 332 provides descriptive information for the task represented by element 330.

The <RoleDefinitions> element 392 contains a child <RoleDefinition> element for each role node (i.e., each node of type "role") defined in the underlying mind map. Accordingly, <RoleDefinition> element 360 represents node 160, <RoleDefinition> element 370 represents node 170, and <RoleDefinition> element 380 represents node 180. In a preferred embodiment, <RoleDefinition> element 360 is generated responsive to detecting the presence of the value "role" in the "VALUE" attribute of <attribute> element 261 of document 200. The <attribute> element 262 of document 200—which corresponds to property 162 from FIG. 1—is then transformed by an embodiment of the present invention into element 362 within the <RoleDefinition> element 360 of document 300. Similarly, <RoleDefinition> elements 370, 380 are generated responsive to detecting the presence of the value "role" in the "VALUE" attribute of <attribute> elements 271, 281 of document 200, and <attribute> elements 272, 282 are then transformed into elements 372, 382 within the <RoleDefinition> elements 370, 380 of document 300.

Figure 4:
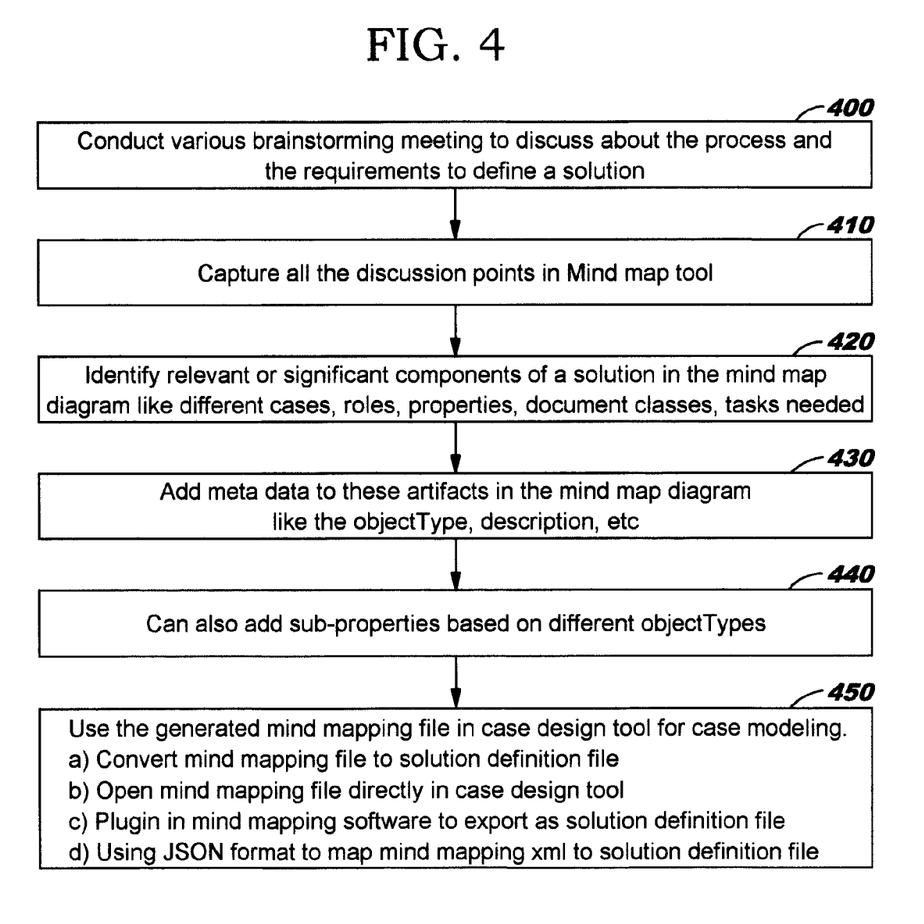
FIG. 4 provides a flowchart depicting logic which may be used when implementing one or more embodiments of the present invention.

FIG. 4 provides a flowchart depicting logic which may be used when implementing one or more embodiments of the present invention. Block 400 indicates that one or more brainstorming sessions are conducted in order for collaborators to discuss the process and the requirements to be represented in a particular case modeling solution. The discussion points are captured using a mind mapping diagram of a mind mapping tool, as indicated by Block 410. Collaborators in the brainstorming session identify the relevant or significant components of the proposed solution, as indicated by Block 420. These may comprise, by way of example, different cases, roles, properties, document classes, tasks, and so forth that will be needed for the case modeling solution. The solution artifacts are then augmented with metadata, using the mind mapping diagram within the mind mapping tool, as indicated by Block 430. The metadata may comprise, by way of example, objectType, description, and so forth. Metadata for various sub-properties may also be added, as indicated at Block 440. Refer to the discussion of FIG. 1, above, for more information on metadata that may be deemed useful when augmenting a mind map for integrating with case management to generate a case model as disclosed herein.

Block 450 indicates that the mind mapping file which is generated as output of the mind mapping tool, following operation of Block 440, may be processed in several different ways for integration with a case management system. Each of these will now be discussed in more detail.

In a first approach listed at Block 450, the mind mapping output file may be converted to a solution definition file that will be consumed directly by the case management system. This first approach preferably comprises invoking a conversion utility that requests an identification of which mind mapping file is to be converted, and then creates a solution definition file from that mind mapping file. This approach has been illustrated above by the sample mind mapping output file 200 of FIG. 2 and the sample solution definition file 300 of FIG. 3 to which file 200 is converted. The solution definition file created by the conversion utility may be opened in the case management system as if it was originally created within the case management system. Accordingly, a business analyst using this first approach preferably opens the case management system and is then presented with a menu (or other data entry means) for identifying a particular solution definition file that is to be opened with the case modeling tool. This menu therefore includes a selectable file name of the solution definition file that is created by conversion from the mind mapping file. The conversion utility may be adapted for generating output to adhere to the syntax requirements of one or more case management systems, and the sample format shown in FIG. 3 is illustrative of syntax that may be used with a representative case management system.

In a second approach listed at Block 450, the mind mapping output file may be opened directly by the case management system. A business analyst using this second approach preferably opens the case management system and is then presented with a menu (or other data entry means) for identifying a particular solution definition file that is to be opened with the case modeling tool. An entry corresponding to a mind mapping output file may be provided in this menu; alternatively, a separate selection menu may be provided that enables the business analyst to select a mind mapping output file. In either case, responsive to the business analyst selecting to open a mind mapping output file (rather than an already-created solution definition file), an embodiment of the present invention performs a conversion of this mind mapping file into the syntax required for a solution definition file. Preferably, this comprises automatically invoking the conversion utility discussed above. With reference to FIGS. 2 and 3, for example, the sample solution definition file 300 of FIG. 3 is thus created by converting the sample mind mapping output file 200 of FIG. 2 responsive to selection of the mind mapping output file 200 by the business analyst from within the case modeling tool. The business analyst may then interact with the created business objects as needed for case modeling. (Note that in this approach, it is not strictly necessary for the business analyst to be aware that some selectable files presented in a selection are already-created solution definition files while other selectable files are mind mapping output files that require conversion responsive to being selected.)

In a third approach listed at Block 450, a plug-in may be created for extending the mind mapping system, where this plug-in is added to the mind mapping system to enable performing the conversion from a mind mapping output file (such as mind mapping output file 200) to a solution definition file (such as solution definition file 300 of FIG. 3). For example, the business analyst may be presented with a menu of choices for saving output of the mind mapping tool, and the plug-in may be represented on this menu as (by way of illustration only) a choice such as "Export for case management". The conversion to a solution definition format then occurs within the operation of the mind mapping tool, responsive to selecting this "Export . . . " choice, and the solution definition file that is created by the plug-in may then be opened in the case management system as if it was originally created within the case management system. Note that a persistent version of the mind mapping output is preferably still created, using the conventional mind mapping file syntax, in order to facilitate subsequent editing or review of the mind map within the mind mapping tool.

Figure 5:
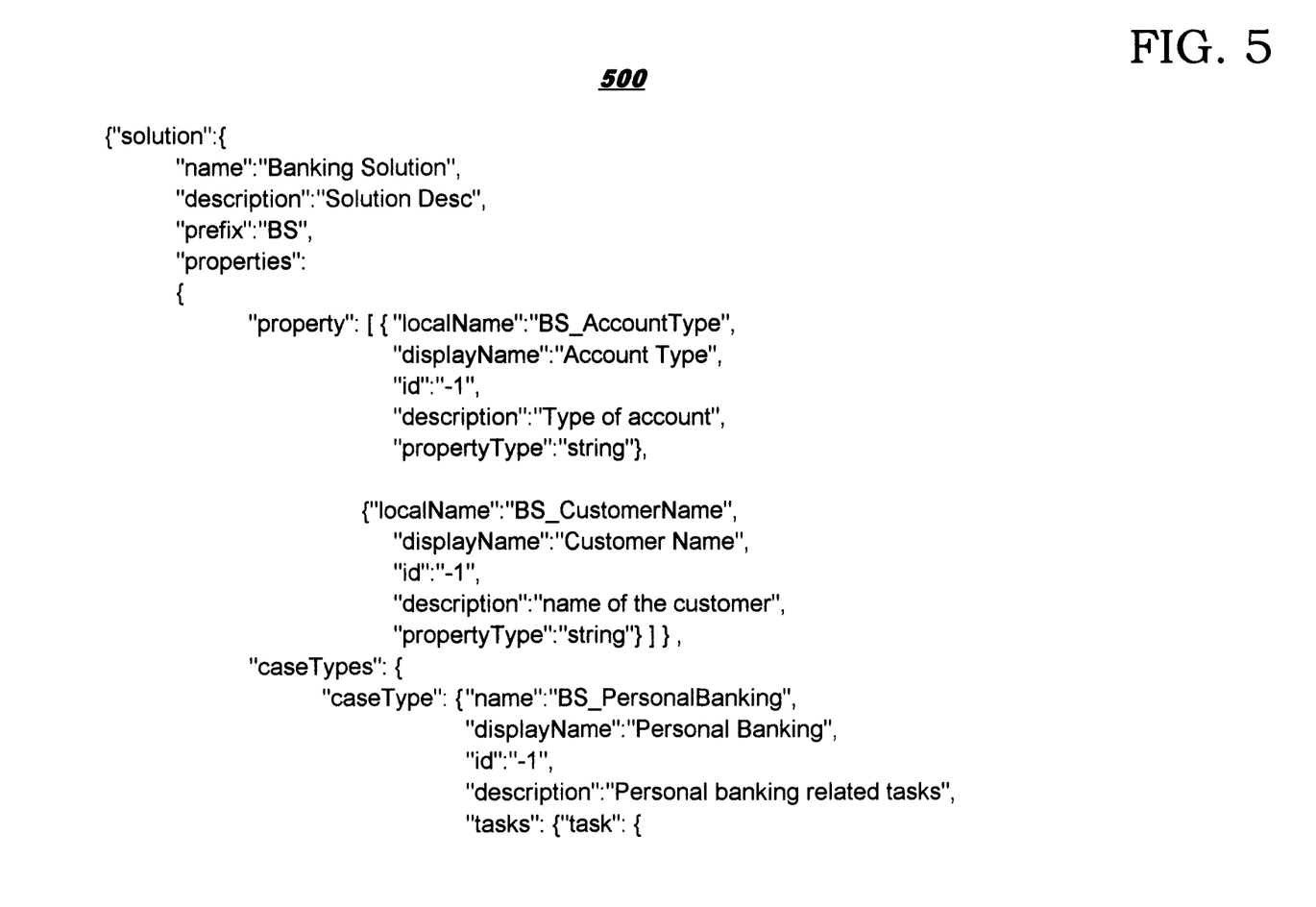
FIG. 5 provides a sample JSON (JavaScript Object Notation) document that may be generated as input to a case management system, and which corresponds to the mind mapping system output document shown in FIG. 2.

In a fourth approach listed at Block 450, the mind mapping output file may be converted to the well-known JSON format. JSON is an abbreviation for JavaScript Object Notation, and refers to a syntax that can be opened directly in a browser and that can also be parsed and used by a number of other commercially-available products. A sample JSON file 500 that corresponds to the mind mapping output file 200 of FIG. 2 (and which represents the mind map 100 of FIG. 1) is shown in FIG. 5. (The JSON syntax is readily understood by those of ordinary skill in the art, and thus is not described in further detail herein.) A mind mapping tool may include an option to export its output into JSON format. As another alternative, a conversion utility may be invoked for converting the mind mapping output into the JSON format. A case management system may include an option to open a JSON file for retrieving a case model defined therein. In any case, upon opening a JSON file such as file 500 with a case management system, the objects represented therein are automatically populated and made available for use in the case management system.

As will be readily understood by those of ordinary skill in the art, particular case management systems may use differing syntax for their input files. Accordingly, while an example of a solution definition file 300 has been provided in FIG. 3, this is merely illustrative, and an alternative syntax may be used without deviating from the scope of the present invention. As will also be readily understood, the process of converting from the output syntax of a particular mind mapping tool to the input syntax of a particular case management system will vary, depending on the syntax requirements to which the input files and the output files adhere. It will be obvious to one of ordinary skill in the art, given the teachings provided herein, how such conversion utility can be constructed.

As has been demonstrated, embodiments of the present invention enable integrating mind mapping with case management, and thus it becomes easier to transform free-form thoughts (such as textual notes and diagrams created during a brainstorming session) into tangible case management solution artifacts. Examples of such artifacts include to-do list items and form templates. Case management design can now proceed relatively rapidly and with much less effort, as contrasted to known techniques, due to removing from the business analyst the burden of manually creating the solution artifacts. Extensibility may be improved, whereby a solution created using the disclosed techniques can be extended relatively easily to create new solutions. By removing the requirement for the business analyst to manually create case management solution artifacts, the turnaround time for translating ideas into solutions may be significantly reduced.

Figure 6:
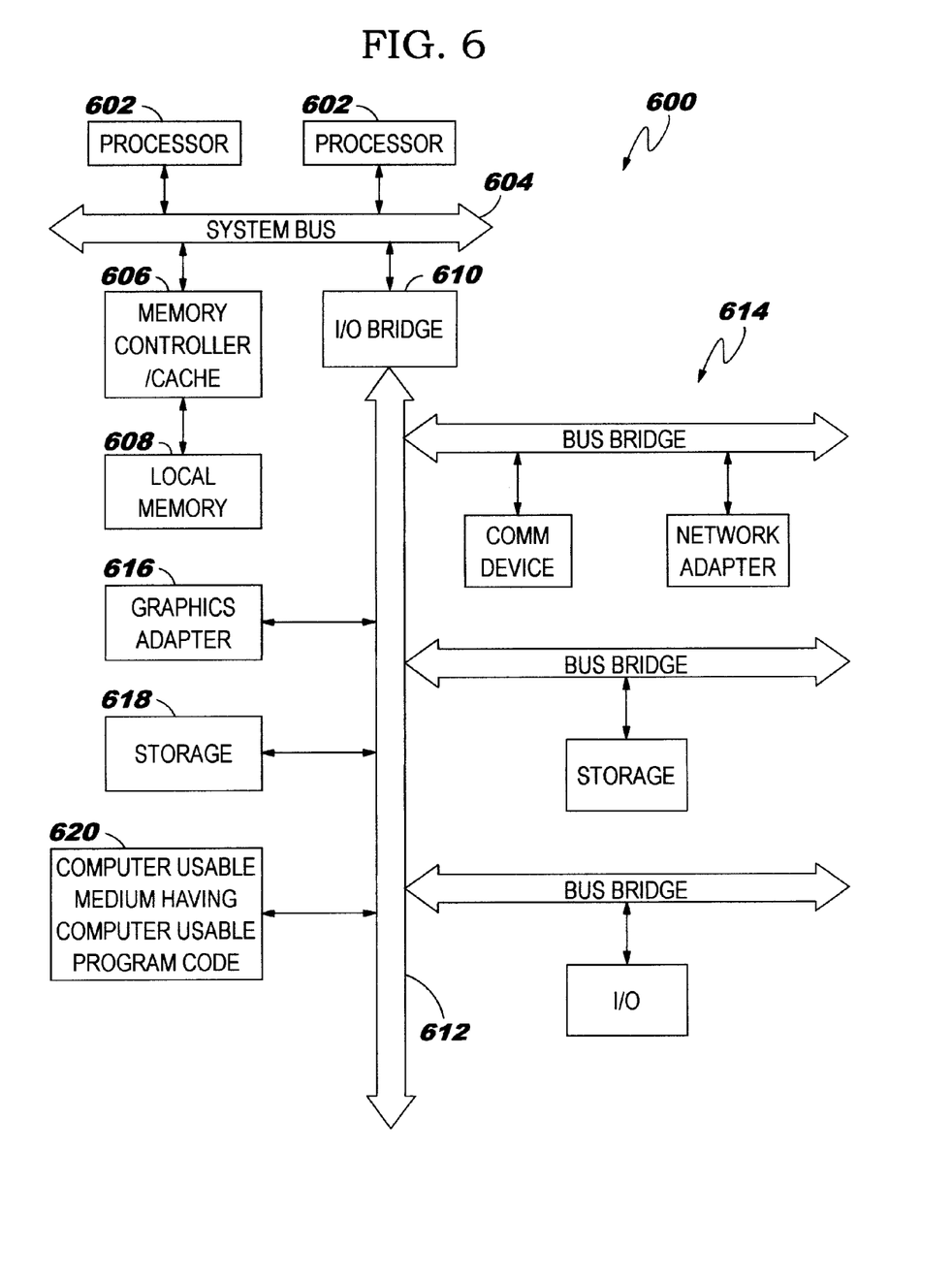
FIG. 6 depicts a data processing system suitable for storing and/or executing program code.

Referring now to FIG. 6, a block diagram of a data processing system is depicted in accordance with the present invention. Data processing system 600, such as one of the processing devices described herein, may comprise a symmetric multiprocessor ("SMP") system or other configuration including a plurality of processors 602 connected to system bus 604. Alternatively, a single processor 602 may be employed. Also connected to system bus 604 is memory controller/cache 606, which provides an interface to local memory 608. An I/O bridge 610 is connected to the system bus 604 and provides an interface to an I/O bus 612. The I/O bus may be utilized to support one or more buses 614 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 616, storage 618, and a computer usable storage medium 620 having computer usable program code embodied thereon. The computer usable program code may be executed to execute any aspect of the present invention, as have been described herein.

The data processing system depicted in FIG. 6 may be, for example, an IBM System p® system, a product of International Business Machines Corporation in Armonk, N.Y., running the Advanced Interactive Executive (AIX®) operating system. An object-oriented programming system such as Java may run in conjunction with the operating system and provides calls to the operating system from Java® programs or applications executing on data processing system. ("System p" and "AIX" are registered trademarks of International Business Machines Corporation in the United States, other countries, or both. "Java" is a registered trademark of Oracle America, Inc., in the United States, other countries, or both.)

Figure 7:
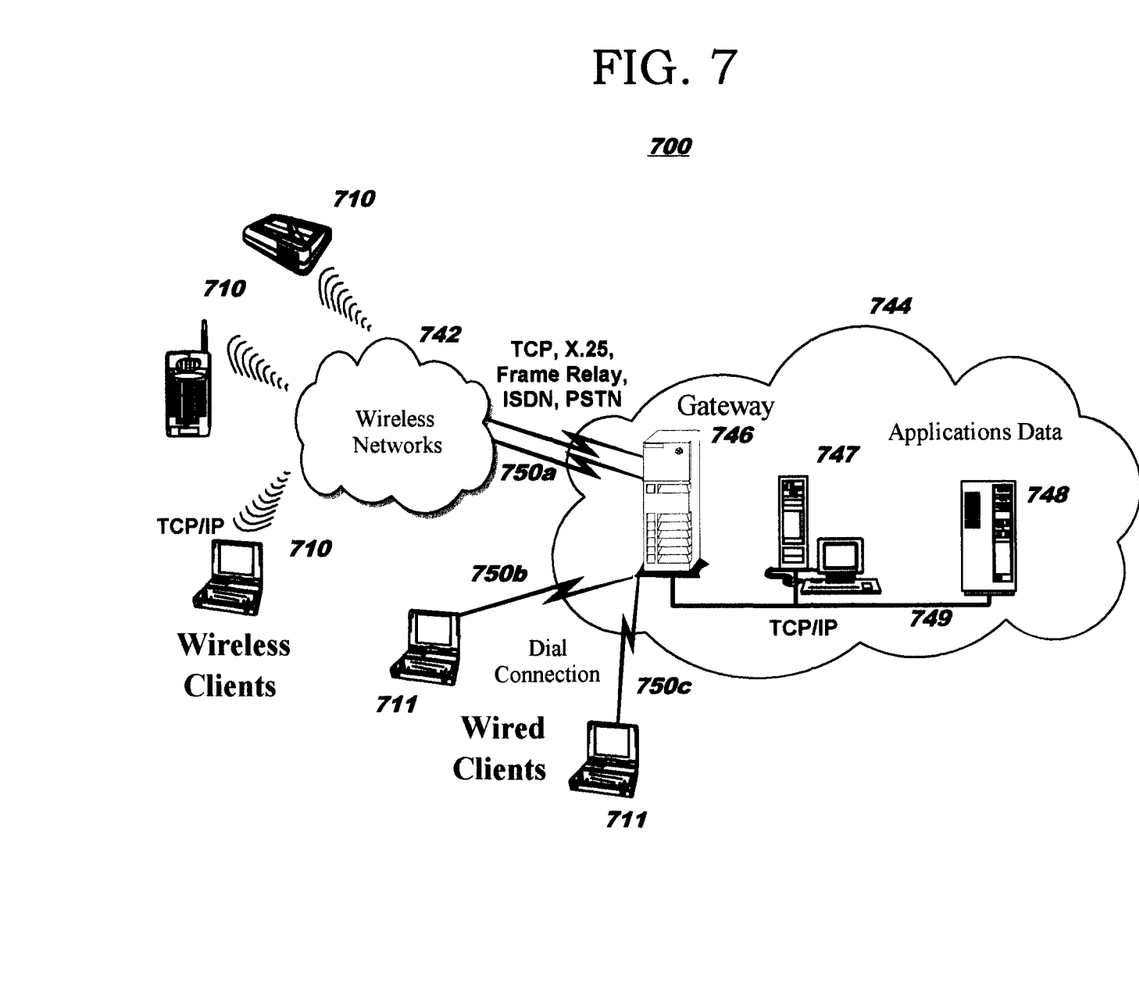
FIG. 7 depicts a representative networking environment in which one or more embodiments of the present invention may be used.

FIG. 7 illustrates a data processing network environment 700 in which the present invention may be practiced. The data processing network 700 may include a plurality of individual networks, such as wireless network 742 and wired network 744. A plurality of wireless devices 710 may communicate over wireless network 742, and a plurality of wired devices, shown in the figure (by way of illustration) as workstations 711, may communicate over network 744. Additionally, as those skilled in the art will appreciate, one or more local area networks ("LANs") may be included (not shown), where a LAN may comprise a plurality of devices coupled to a host processor.

Still referring to FIG. 7, the networks 742 and 744 may also include mainframe computers or servers, such as a gateway computer 746 or application server 747 (which may access a data repository 748). A gateway computer 746 serves as a point of entry into each network, such as network 744. The gateway 746 may be preferably coupled to another network 742 by means of a communications link 750a. The gateway 746 may also be directly coupled to one or more workstations 711 using a communications link 750b, 750c, and/or may be indirectly coupled to such devices. The gateway computer 746 may be implemented utilizing an Enterprise Systems Architecture/390® computer available from IBM. Depending on the application, a midrange computer, such as an iSeries®, System i™, and so forth may be employed. ("Enterprise Systems Architecture/390" and "iSeries" are registered trademarks, and "System i" is a trademark, of IBM in the United States, other countries, or both.)

The gateway computer 746 may also be coupled 749 to a storage device (such as data repository 748).

Those skilled in the art will appreciate that the gateway computer 746 may be located a great geographic distance from the network 742, and similarly, the workstations 711 may be located some distance from the networks 742 and 744, respectively. For example, the network 742 may be located in California, while the gateway 746 may be located in Texas, and one or more of the workstations 711 may be located in Florida. The workstations 711 may connect to the wireless network 742 using a networking protocol such as the Transmission Control Protocol/Internet Protocol ("TCP/IP") over a number of alternative connection media, such as cellular phone, radio frequency networks, satellite networks, etc. The wireless network 742 preferably connects to the gateway 746 using a network connection 750a such as TCP or User Datagram Protocol ("UDP") over IP, X.25, Frame Relay, Integrated Services Digital Network ("ISDN"), Public Switched Telephone Network ("PSTN"), etc. The workstations 711 may connect directly to the gateway 746 using dial connections 750b or 750c. Further, the wireless network 742 and network 744 may connect to one or more other networks (not shown), in an analogous manner to that depicted in FIG. 7.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of integrating a mind mapping tool with a case management tool, comprising:
    obtaining a mind mapping diagram created as output of a mind mapping tool, the diagram comprising a plurality of interconnected nodes which together represent a concept defined using the mind mapping tool; and
    importing the mind mapping diagram into the case management tool for modeling the defined concept as a case model, thereby integrating the mind management tool with the case management tool, comprising:
        augmenting each of the nodes in the mind mapping diagram with metadata to describe each of at least one attribute of the each node, wherein the at least one attribute for each node specifies a corresponding attribute defined for the node in the mind mapping tool;
        programmatically converting a representation of the mind mapping diagram from a first format used by the mind mapping tool to a second representation of the mind mapping diagram in a second format used by the case management tool, wherein the second representation represents each of the nodes and the metadata for each of the nodes and the second format is a solution definition file consumable by the case management tool; and
        programmatically generating the case model from the second representation, the case model operable in the case management tool, comprising:
            generating a corresponding target object for each of the nodes; and
            populating, from the metadata for each of the nodes, the corresponding target object.

2. The method according to claim 1, wherein the programmatically converting is performed by a utility that maps the first format to the second format.

3. The method according to claim 1, further comprising opening, in the case management tool, a file containing the second representation of the diagram in the second format, the opening causing the generating and the populating of the corresponding target object for each of the nodes.

4. The method according to claim 1, further comprising:
    opening, in the case management tool, a file containing the representation of the diagram in the first format; and
    performing, responsive to the opening, the programmatically converting and the programmatically generating.

5. The method according to claim 1, further comprising:
    providing, in the mind mapping tool, a selectable choice that invokes the programmatically converting; and
    responsive to selection of the selectable choice, performing the programmatically converting and storing the second representation in the second format as an additional output of the mind mapping tool.

6. The method according to claim 1, wherein the second format comprises a JavaScript Object Notation format.

7. The method according to claim 1, further comprising providing, in the mind mapping tool, a plurality of predefined attribute types and attribute values as selectable choices for use in the augmenting, the predefined attribute types and attribute values being relevant to case modeling in the case management tool.

8. A system for integrating a mind mapping tool with a case management tool, comprising:

a computer comprising a processor; and instructions which are executable, using the processor, to implement functions comprising:

creating a mind mapping diagram as output of a mind mapping tool, the diagram comprising a plurality of interconnected nodes which together represent a concept defined using the mind mapping tool; and importing the mind mapping diagram into the case management tool for modeling the defined concept as a case model, thereby integrating the mind management tool with the case management tool, comprising:

augmenting each of the nodes in the mind mapping diagram with metadata to describe each of at least one attribute of the each node, wherein the at least one attribute for each node specifies a corresponding attribute defined for the node in the mind mapping tool;

converting a representation of the mind mapping diagram from a first format used by the mind mapping tool to a second representation of the mind mapping diagram in a second format used by the case management tool, wherein the second representation represents each of the nodes and the metadata for each of the nodes and the second format is a solution definition file consumable by the case management tool; and programmatically generating the case model from the second representation, the case model operable in the case management tool, comprising:

generating a corresponding target object for each of the nodes; and populating, from the metadata for each of the nodes, the corresponding target object.

9. The system according to claim 8, wherein:

the converting is performed by a utility that maps the first format to the second format; and the utility is invoked to perform the converting on a file created as output of the mind mapping tool.

10. The system according to claim 8, wherein the functions further comprise opening, in the case management tool, a file containing the second representation of the diagram in the second format, the opening causing the generating and the populating of the corresponding target object for each of the nodes.

11. The system according to claim 8, wherein the functions further comprise:

opening, in the case management tool, a file containing the representation of the diagram in the first format; and performing, responsive to the opening, the programmatically converting and the programmatically generating.

12. The system according to claim 8, wherein the functions further comprise:

providing, in the mind mapping tool, a selectable choice that invokes the programmatically converting; and responsive to selection of the selectable choice, performing the programmatically converting and storing the second representation in the second format as an additional output of the mind mapping tool.

13. A computer program product for integrating a mind mapping tool with a case management tool, the computer program product comprising:

a non-transitory computer readable storage medium having computer readable program code embodied therein, the computer readable program code configured for:

obtaining a mind mapping diagram created as output of a mind mapping tool, the diagram comprising a plurality of interconnected nodes which together represent a concept defined using the mind mapping tool; and importing the mind mapping diagram into the case management tool for modeling the defined concept as a case model, thereby integrating the mind management tool with the case management tool, comprising:

augmenting each of the nodes in the mind mapping diagram with metadata to describe each of at least one attribute of the each node, wherein the at least one attribute for each node specifies a corresponding attribute defined for the node in the mind mapping tool;

converting a representation of the mind mapping diagram from a first format used by the mind mapping tool to a second representation of the mind mapping diagram in a second format used by the case management tool, wherein the second representation represents each of the nodes and the metadata for each of the nodes and the second format is a solution definition file consumable by the case management tool; and programmatically generating the case model from the second representation, the case model operable in the case management tool, comprising:

generating a corresponding target object for each of the nodes; and populating, from the metadata for each of the nodes, the corresponding target object.

14. The computer program product according to claim 13, wherein:

the converting is performed by a utility that maps the first format to the second format; and the utility is invoked to perform the converting on a file created as output of the mind mapping tool.

15. The computer program product according to claim 13, wherein the computer readable program code is further configured for opening, in the case management tool, a file containing the second representation of the diagram in the second format, the opening causing the generating and the populating of the corresponding target object for each of the nodes.

16. The computer program product according to claim 13, wherein the computer readable program code is further configured for:

opening, in the case management tool, a file containing the representation of the diagram in the first format; and performing, responsive to the opening, the programmatically converting and the programmatically generating.

17. The computer program product according to claim 13, wherein the computer readable program code is further configured for:

providing, in the mind mapping tool, a selectable choice that invokes the programmatically converting; and responsive to selection of the selectable choice, performing the programmatically converting and storing the second representation in the second format as an additional output of the mind mapping tool.

18. The method according to claim 1, wherein the second representation specifies the nodes and the metadata as at least one property of the case model, at least one case type of the case model, and at least one role of the case model.

\* \* \* \* \*